Figure 1:
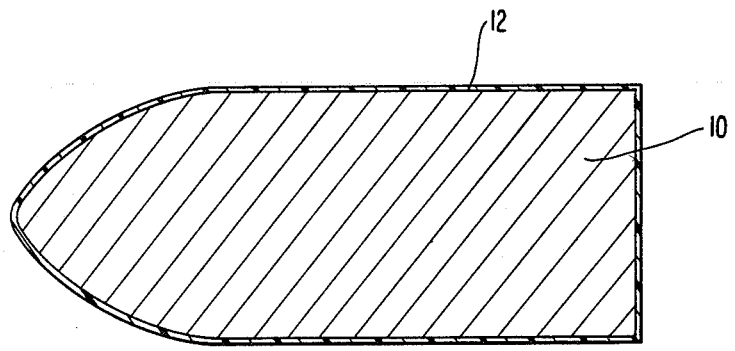

United States Patent [19] [11] 4,328,750
Oberg et al. [45] May 11, 1982

[54] PLASTIC COATED AMMUNITION AND METHODS OF MANUFACTURE

[75] Inventors: James L. Oberg, Suffield; Roger J. Curran, Stratford, both of Conn.; Michael Czayka, Warren, Ohio

[73] Assignee: Bangor Punta Corporation, Greenwich, Conn.

[21] Appl. No.: 955,072

[22] Filed: Oct. 26, 1978

[51] Int. Cl.³ .......................... F42B 5/00; F42B 11/04
[52] U.S. Cl. .................... 102/514; 102/376; 427/195; 428/458; 428/469; 428/645; 427/376.6; 427/419.7; 427/419.8
[58] Field of Search .......... 102/92.2, 38 WR; 427/195, 376 E, 419 F, 419 G; 428/458, 469, 645

[56] References Cited

U.S. PATENT DOCUMENTS

| | | | |
|---|---|---|---|
| 2,703,768 | 3/1955 | Hall | 102/38 WR |
| 2,928,348 | 3/1960 | Zisman et al. | 102/93 |
| 3,356,029 | 12/1967 | Seidel | 102/92 |
| 3,397,636 | 8/1968 | Jacobson et al. | 102/38 WR |
| 3,403,626 | 10/1968 | Jacobson et al. | 102/38 WR |
| 3,429,261 | 2/1969 | Goldstein | 102/38 WR |
| 3,580,178 | 5/1971 | Kopsch et al. | 102/92.2 |
| 3,910,194 | 10/1975 | Dehm et al. | 102/93 |

FOREIGN PATENT DOCUMENTS 1199670 8/1965 Fed. Rep. of Germany ........ 102/38 WR
531389 1/1941 United Kingdom .
695195 8/1953 United Kingdom .

OTHER PUBLICATIONS

Bronson, Wall Street Journal, Oct. 19, 1978, p. 35.

Primary Examiner—Brooks H. Hunt
Assistant Examiner—Irwin Gluck
Attorney, Agent, or Firm—Patrick J. Walsh

[57] ABSTRACT

Disclosed is a lead bullet having a coating comprised of a thermoplastic composition of molybdenum disulfide and Nylon 11. Nylon 11 per se and other coatings are also disclosed. The coating minimizes or prevents deposition of lead along the barrel and other mechanisms of a firearm. To apply the coating, the bullet is initially degreased and heated to clean its surfaces. A phosphate coating is applied and the bullet is heated to a temperature of at least 425° F. The heated bullet is then disposed in blended molybdenum disulfide and Nylon 11 powder, Nylon 11 per se, or other coating materials to obtain a coating thickness within a range of 1–12 mils. The coated bullet is subsequently heated to at least 367° F. to fuse and to densify the coating on the bullet.

24 Claims, 2 Drawing Figures

PLASTIC COATED AMMUNITION AND METHODS OF MANUFACTURE

The present invention relates generally to ammunition and methods of manufacturing ammunition and particularly relates to a plastic coating for lead bullets and method of applying the coating to the bullets to minimize or eliminate the deposition of lead along the barrel of the firearm and which lead deposition is deleterious to the ballistic characteristics and accuracy of the bullet.

When ammunition, consisting of the conventional lead bullet, is subjected to the heated blast, high pressures and frictions within the barrel of a firearm, the bullet usually and undesirably deposits lead along the barrel and its rifling and generally fouls the mechanism of the firearm. Eventually, these lead deposits along the barrel and rifling interfere with the accuracy and ballistic characteristics of the bullet when fired.

Various proposals to minimize or eliminate the tendency of the bullets to deposit lead along the barrel and rifling of the firearm thus preventing fouling the firearm and its mechanism have been proposed and utilized in the past. For example, grease-type lubricants have been applied to bullets. These lubricants have achieved a measure of success in controlling the deposition of lead along the barrel and mechanisms of the firearm. However, such success is achieved at the cost of rendering the bullet difficult to handle as well as creating fouling problems within the firearm of a different kind. For example, present wax or grease coatings can cause fouling if too thinly applied and can cause excessive smoking if too heavily applied. Also, the ballistics of the bullet and particularly its accuracy is affected by the deep lubrication grooving normally required and by gas-cutting that occurs as a result of the effect of bore friction in combination with the hot propellant gases.

Copper alloy coatings have been applied to bullets and these are effective to minimize or prevent fouling of the firearm and the deposition of lead along its barrel. Copper alloy jacketing or half-jacketing is particularly applicable to bullets used in high velocity firearms where it is absolutely necessary to avoid excessive fouling. However, the velocity at which such copper jacketing or half-jacketing is required to achieve that result occurs at velocities similar to those obtainable in modern high performance Magnum ® pistols and revolvers. It will be appreciated that copper alloy jacketed or half-jacketed bullets are expensive to manufacture and, for that reason, it is desirable to obtain a low-cost high-velocity lead bullet without the detriment of it fouling the firearm or effecting the ballistic characteristics or accuracy of the bullet.

Accordingly, it is a primary object of the present invention to provide novel and improved ammunition coated to minimize or eliminate lead deposition along the bore of the gun and its mechanisms.

It is another object of the present invention to provide novel and improved ammunition coated to minimize or eliminate lead deposition along the bore and in the mechanisms of the firearm and which coating is readily and easily applied to the lead bullet.

It is still another object of the present invention to provide novel and improved ammunition coated to minimize or eliminate lead deposition along the bore and in the mechanisms of the firearm and which coating is relatively inexpensive and inexpensive to apply to the bullet.

Another object is to provide a bullet for improved ammunition to minimize smoke generation which obscures visibility and impedes aiming accuracy in the shooting area.

Another object is to provide a bullet for improved ammunition to minimize contamination of the air with toxic lead particles especially in indoor shooting ranges.

Another object is to obtain the improved bullet expansion characteristics possible in soft-unjacketed lead bullets when in high performance.

Another object is to permit use of soft-unjacketed lead bullets in place of fully or semi-jacketed bullets in high performance cartridges thereby to obtain the improved terminal ballistics such as bullet expansion characteristics of unjacketed lead bullets.

Another object of the invention is to obtain a bullet which in a loaded round will reduce the pick-up of foreign particles on the surface of the bullet which may score the gun barrel or which may exacerbate wound injuries.

Another object of the invention is to obtain a bullet which in a loaded round is clean, smooth, and facilitates loading in a weapon.

Another object of the invention is to provide a bullet coating system which is capable of being accurately sized especially at the bullet bearing surface in an ammunition manufacturing operation.

It is a further object of the present invention to provide novel and improved ammunition coated to minimize or eliminate lead deposition along the bore in the mechanisms of the firearm while obtaining excellent ballistic characteristics including high accuracy when the bullet is fired from the firearm.

Additional objects and advantages of the invention will be set forth in part in the description which follows and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the ammunition of this invention comprises a conventional lead alloy bullet and a dense adherent coating on the bullet, and the coating inculding a thermoplastic composition of molybdenum disulfide and Nylon. The Nylon comprieses Nylon 11 and the molybdenum disulfide constitutes 5% or less of the total composition, with the balance of the composition consisting of Nylon 11. Alternatively, the coating may consist of Nylon 11 per se. The coating is made adherent to the bullet by a thorough cleaning of oils from the surface of the bullet followed by chemical removal of loosely adherent oxides and by chemically stabilizing the surface of the bullet. In addition, another agent is applied which is capable of developing a chemically compatible bridge between the stabilizing bullet surface and the Nylon 11 coating. In the preferred embodiment the bullet is first vapor-degreased, then it is dipped into a series of tanks which chemically generate an adherent phosphate coating on the bullet. Following the phosphate tanks the bullet is dried and an organic polymeric primer is applied as a thin coating over the phosphated bullet. This coating may be any common primer known in the art to promote adhesion with Nylon 11 such as the phenolic or acrylic-epoxy type primers marked for this purpose. In the preferred method of applying the coating, including either Nylon 11 and molybdenum disulfide composition or Nylon 11 per se, the coating is provided in powder form. The composition including Nylon 11 and molybdenum disulfide is initially mechanically blended. Prior to applying the coating to the bullet, the bullet is heated, preferably to a temperature at least 425° F., and the heated bullet is then disposed in the selected powder coating. The thickness of the coating about the bullet is a function of the temperature of the preheated bullet whereby the thickness of the coating can be controlled in direct proportion to the temperature of the preheated bullet. Also, the preferred method includes subsequently heating the coated bullet to at least 367° F. to fuse and to densify the selected coating on the lead bullet.

In another method for applying the coating to the bullet, the bullet is prepared for coating by degreasing with a solvent such as perchloroethylene. Thereafter the bullet is preheated to about 425° F. and disposed in the selected coating. The bullet then is heated to at least 367° F. to fuse and densify the coating on the lead bullet.

Figure 2:
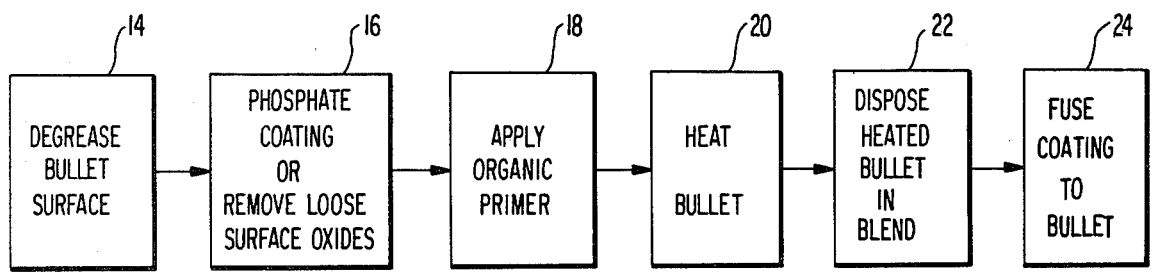

The invention consists in the novel constructions, arrangements, combinations and improvements shown and described in this specification and in the drawings of which:

FIG. 1 is a longitudinal cross-sectional view of ammunition constructed in accordance with the present invention with the novel and improved coating hereof applied; and FIG. 2 is a block diagram illustrating the steps of coating the ammunition in accordance with the present invention.

Reference will now be made in detail to the present preferred embodiment of ammunition manufactured in accordance with the present invention as illustrated in FIG. 1 of the accompanying drawing.

Referring now to FIG. 1, there is illustrated a bullet, generally designated 10, and formed of lead or lead alloy in a conventional manner. About the surface of the bullet and fully encapsulating it, is a polymeric coating 12 of a specified composition and which coating minimizes or eliminates lead deposition along the bore and in the mechanisms of a firearm not shown, when the bullet is fired from the firearm. Particularly, coating 12 is formed of a composition of molybdenum disulfide and Nylon. The molybdenum disulfide may comprise 5% or less of the total content of the coating composition, with the balance of the composition preferably comprised of the Nylon material. Preferably, however, the molybdenum disulfide constitutes 2–3% of the total coating composition with the balance of the composition being of a Nylon material.

Nylon 11 is the preferred Nylon material used in the composition. It will be appreciated that the entirety of the coating composition is preferably formed of molybdenum disulfide and Nylon 11 within the specified ranges. If desired, the composition may also contain up to 10% pigmentation such as organic or inorganic titanium dioxide, carbon black, chrome yellow, chrome green, a cobalt salt, etc. In lieu of the pigmentation, fillers could be employed up to 10% of the composition. For example, such fillers may include teflon powder, talc, mica, graphite, etc.

The coating 12 illustrated in FIG. 1 is acceptable, when applied within a thickness range of 1–12 mils with the results varying in accordance with the thickness. Preferably, a coating thickness on the order of 3–4 mils on one side, i.e., the bullet diameter plus 3–4 mils on a side or 6–8 mils, has been found to be optimum.

To coat the bullet in accordance with a preferred form of the present invention and referring to FIG. 2, lead bullet 10 is first formed in the conventional manner and then degreased as schematically indicated at 14 in FIG. 12. For example a typical degreasing agent such as trichloroethylene, methylene chloride, or perchloroethylene may be utilized for vapor degreasing such bullet. In this manner, impurities of an oily nature on the surface of the lead bullet are removed. A phosphate coating is then applied as indicated at 16 and this coating serves to promote the bonding of the subsequently applied primer coat at 18. Alternatively, the primer coating can be eliminated provided the phosphate coating of the bullet is effective to generate sufficient adhesion with the Nylon 11 composition. Also a primer may be applied to the degreased lead bullet after loose oxides are removed by acid treatment such as with sulphuric acid. For example, the primer may comprise a phenolic or acrylic-epoxy type.

As a further alternative, the bullet may be prepared for coating by a vapor degreasing and thereafter heated as described below without application of a phosphate coating or a primer coat.

Molybdenum disulfide and Nylon 11 are provided in powder form and are mechanically blended one with the other within the aforesaid intended ranges of composition such that the subsequent application of the coating to the lead bullet will result in a coating which is uniform in composition along the entire surface area of the bullet. The lead bullet 10 is then heated, as indicated in FIG. 2 at 20, preferably to at least 425° F. or more. As indicated at 22 in FIG. 2, the heated bullet is then disposed in the blended molybdenum disulfide and Nylon 11 powder composition. The blend is maintained agitated by vibrators or by tumbling during bullet contact. The coating thickness on the lead bullet is a function of the temperature of the bullet when disposed in the blend of molybdenum disulfide and Nylon 11 powder. A minimum thickness coating for example on the order of 1–2 mils is achieved by preheating the lead bullet to approximately 425° F. If a thicker coating is desired, for example a coating of approximately 12 mils, the bullet is heated to approximately 500° F. Thus, preheating the bullet to temperatures intermediate 425° F. and 500° F. achieves a corresponding coating thickness.

If desired, after the coating has been deposited on the lead bullet, the coated bullet may be reheated to at least 367° F. (24 in FIG. 2) in order to fuse and to densiby the molybdenum disulfide and Nylon 11 coating on the lead bullet.

The molybenum disulfide and Nylon 11 powder may also be applied by the lead bullet electrostatically or by means of a fluidized bed. However, the above-described method of applying the coating is the preferred method.

In another embodiment of the invention, a coating of Nylon 11 is applied to the bullet. The bullet is prepared for coating by preparing the bullet surface in one of the alternative methods described above. Thereafter the bullet is preheated to about 425° F. and disposed in powdered Nylon 11. The bullet is then heated to at least 367° F. to fuse and densify the coating on the lead bullet.

For certain high pressure rounds such as a 0.357 Magnum ® round, it is desirable to roughen the surface of the bullet by knurling or other abrading in order to improve adherence of coating to bullet during firing. When bullets are fired at pressures of up to 40,000 psi there is substantial flexing of the bullet as it enters the gun barrel and there is a marked tendency for the bullet to stretch and elongate. Roughening the bullet surface through knurling and the like retards the tendency of the coating to stretch with respect to the bullet surface. Without such roughening, the coating would tend to wipe from the surface of such high pressure rounds.

While Nylon 11 or a blend of Nylon 11 and molybdenum disulfide are preferred coatings, other coating materials such as Nylon blends, polyethylene, polypropylene, epoxies, or polyacetal plastics exhibiting high lubricity such as Delrin ® and Celeon ® may be used. Such alternate coating compositions should have a melting point no higher than 600° F. and preferably between 250° F. and approximately 475° F. That is the coating melting point should be below the corresponding lead or lead alloy bullet melting temperature which ranges from about 486° F. to about 621° F. If desired, lubricating agents such as graphite, Teflon powder, mica, and the like may be added in quantities up to 5% to aid lubricity of the coating compositions. If desired, the aforesaid process may be employed to apply these other coating materials.

In the case of epoxy coating compositions it is preferable to use electrostatis deposition techniques for coating the bullet.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. Ammunition comprising:
   a lead bullet; and
   a coating on said bullet, said coating including a thermoplastic composition of molybdenum disulfide and nylon 11.

2. Ammunition according to claim 1 wherein said molybdenum disulfide constitutes 5% or less of said composition.

3. Ammunition according to claim 2 wherein said composition consists solely of said molybdenum disulfide and said Nylon 11.

4. Ammunition according to claim 2 wherein said coating completely encapsulates the entirety of said bullet.

5. Ammunition according to claim 1 including a coating formed of a phosphate material between said bullet and said molybdenum disulfide and nylon 11 coating.

6. Ammunition according to claim 1 wherein said coating has a thickness within a range of 1–12 mils.

7. Ammunition according to claim 2 wherein said coating completely encapsulates the entirety of said bullet, a coating formed of a phosphate material between said bullet and said molybdenum disulfide and nylon 11 coating, said molybdenum disulfide and said nylon 11 coating having a thickness within a range of 1–12 mils, said composition consisting solely of said molybdenum disulfide and said nylon 11.

8. A method of coating a bullet comprising the steps of:
   degreasing the bullet,
   heating the bullet, and
   applying a coating comprised of molybdenum disulfide and nylon 11 to said bullet.

9. A method according to claim 8 including providing the nylon 11 and molybdenum disulfide in powder form and mechanically blending the nylon 11 powder and molybdenum disulfide powder.

10. A method according to claim 8 including fusing the coating to the bullet.

11. A method according to claim 8 including heating the bullet prior to applying the coating to a temperature of at least 425° F.

12. A method according to claim 8 wherein the coating consists of nylon 11 and molybdenum disulfide, and heating the coating to a temperature of at least 367° F. to fuse the coating to the bullet.

13. A method according to claim 8 wherein the Nylon coating consists of Nylon 11 and molybdenum disulfide, providing the Nylon 11 and molybdenum disulfide in powder form, mechanically blending the Nylon 11 powder and molybdenum disulfide powder, heating the bullet prior to applying the coating thereto, subsequently applying the coating to the heated bullet, heating the bullet prior to applying the coating to a temperature of at least 425° F., and heating the coating to a temperature of at least 367° F. to fuse the coating to the bullet.

14. A method according to claim 13 including applying a primer to the bullet before applying said coating.

15. A method of coating a bullet comprising the steps of:
   vapor degreasing the bullet,
   applying a phosphate coating to the bullet,
   applying an organic primer to the bullet,
   heating the bullet to between 425° F. and 500° F.,
   applying a coating consisting of a blend of Nylon 11 and molybdenum disulfide, and
   reheating the coated bullet to at least 367° F. to fuse the coating to the bullet.

16. A method of coating a bullet comprising the steps of:
   degreasing the bullet,
   heating the bullet, and
   applying a coating of nylon 11 to said bullet.

17. The method of coating as defined in claim 16 in which the coating comprises a blend of nylon 11 and pigmentation.

18. Ammunition comprising a lead bullet having a portion of its surface roughened and a protective nylon 11 coating encapsulating substantially the entire bullet for minimizing lead fouling of both a firearm firing the bullet and the ambient air.

19. A method of coating a bullet comprising steps of:
   roughening the surface of the bullet,
   heating the bullet,
   applying a coating of nylon to said bullet, and
   reheating the bullet.

20. A method according to claim 19 in which the bullet is heated to a temperature of at least 425° F., the coating applied to nylon 11, and the bullet is reheated to a temperature of at least 367° F.

21. A method of coating a lead bullet comprising the steps of roughening the surface of the bullet, heating the bullet to at least 425° F., coating the bullet with nylon 11 in powder form and heating the coating to a temperature of at least 367° F. to fuse the coating to the bullet.

22. A bullet produced by the method of claim 21.

23. A method of coating a lead bullet comprising the steps of roughening the surface of the bullet, heating the bullet to a temperature from about 486° F. to about 621° F coating the bullet with a material selected from the group consisting of nylon blends, polyethylene, polypropylene, epoxies, and polyacetal plastic characterized in having a melting point between 250° F. and approximately 475° F., and heating the coating to a temperature at least equal to the melting point of the coating selected for fusing the coating to the bullet.

24. A bullet produced by the method according to claim 23.

* * * * *